US012664991B2

(12) United States Patent
Mundt

(10) Patent No.: US 12,664,991 B2
(45) Date of Patent: Jun. 23, 2026

(54) ENCODING OF ENVELOPE INFORMATION OF AN AUDIO DOWNMIX SIGNAL

(71) Applicant: Dolby International AB, Dublin (IE)

(72) Inventor: Harald Mundt, Fürth (DE)

(73) Assignee: Dolby International AB, Dublin (IE)

( * ) Notice: Subject to any disclaimer, the term of this patent is extended or adjusted under 35 U.S.C. 154(b) by 228 days.

(21) Appl. No.: 18/281,858

(22) PCT Filed: Apr. 5, 2022

(86) PCT No.: PCT/EP2022/059005
§ 371 (c)(1), (2) Date: Sep. 13, 2023

(87) PCT Pub. No.: WO2022/214480
PCT Pub. Date: Oct. 13, 2022

(65) Prior Publication Data
US 2024/0161754 A1 May 16, 2024

Related U.S. Application Data

(60) Provisional application No. 63/268,715, filed on Mar. 1, 2022, provisional application No. 63/171,210, filed on Apr. 6, 2021.

(51) Int. Cl.
*G10L 19/008* (2013.01)
*G10L 19/02* (2013.01)
*G10L 25/21* (2013.01)

(52) U.S. Cl.
CPC ........ *G10L 19/008* (2013.01); *G10L 19/0204* (2013.01); *G10L 25/21* (2013.01)

(58) Field of Classification Search
CPC ...................................................... G10L 19/008
See application file for complete search history.

(56) References Cited

U.S. PATENT DOCUMENTS 9,508,351 B2 11/2016 Kristofer
9,734,833 B2 8/2017 Disch
(Continued)

FOREIGN PATENT DOCUMENTS

WO 2015038522 A1 3/2015

OTHER PUBLICATIONS

Breebaart J et al., Spatial Audio Object Coding (SAOC)—The Upcoming MPEG Standard on Parametric Object Based Audio Coding, Audio Engineering Society (AES) Convention Paper, 124th Convention, May 17-20, 2008, Amsterdam, NL, 16 pages.

*Primary Examiner* — Shaun Roberts

(57) ABSTRACT

A method for encoding envelope information is provided. In some implementations, the method involves determining a first downmixed signal associated with a downmixed channel associated with an audio signal to be encoded. In some implementations, the method involves determining energy levels of the first downmixed signal for a plurality of frequency bands. In some implementations, the method involves determining whether to encode information indicative of the energy levels in a bitstream. In some implementations, the method involves encoding the determined energy levels. In some implementations, the method involves generating an energy control value indicating that energy levels are encoded. In some implementations, the method involves generating the bitstream, wherein the energy control value and the information indicative of the energy levels are usable by the decoder to adjust energy levels associated with the first downmixed signal.

19 Claims, 6 Drawing Sheets

(56) References Cited

U.S. PATENT DOCUMENTS

| | | | | |
|---|---|---|---|---|
| 10,224,040 | B2 | 3/2019 | Huang | |
| 10,930,291 | B2 | 2/2021 | Friedrich | |
| 10,937,435 | B2 | 3/2021 | Fueg | |
| 10,971,163 | B2 | 4/2021 | Hirvonen | |
| 2007/0258607 | A1 * | 11/2007 | Purnhagen | H04R 5/00 381/307 |
| 2011/0224994 | A1 | 9/2011 | Norvell | |
| 2013/0236022 | A1 * | 9/2013 | Virette | G10L 21/0364 381/22 |
| 2016/0005407 | A1 * | 1/2016 | Friedrich | G10L 19/167 381/23 |
| 2016/0111099 | A1 * | 4/2016 | Hirvonen | G10L 19/20 381/22 |
| 2016/0125888 | A1 * | 5/2016 | Purnhagen | G10L 19/008 381/23 |
| 2016/0133262 | A1 * | 5/2016 | Fueg | G10L 21/04 381/22 |
| 2016/0372122 | A1 * | 12/2016 | Zhang | G10L 19/06 |
| 2017/0339505 | A1 * | 11/2017 | Purnhagen | H04S 3/008 |
| 2018/0091914 | A1 | 3/2018 | Villemoes | |
| 2019/0013031 | A1 | 1/2019 | Disch | |
| 2019/0272833 | A1 * | 9/2019 | Borss | H04S 3/008 |
| 2020/0045494 | A1 * | 2/2020 | Liu | H03M 7/3059 |
| 2020/0304913 | A1 | 9/2020 | Purnhagen | |
| 2020/0395023 | A1 | 12/2020 | Purnhagen | |
| 2020/0395024 | A1 | 12/2020 | Disch | |
| 2021/0065723 | A1 | 3/2021 | Disch | |
| 2021/0067898 | A1 | 3/2021 | Neukam | |
| 2021/0082445 | A1 * | 3/2021 | Wang | H04S 1/007 |
| 2022/0122617 | A1 * | 4/2022 | Bouthéon | H04S 3/02 |

* cited by examiner

ENCODING OF ENVELOPE INFORMATION OF AN AUDIO DOWNMIX SIGNAL

CROSS-REFERENCE TO RELATED APPLICATIONS

This application is a U.S. National Stage application under 35 U.S.C. § 371 of International Application No. PCT/EP22/59005, filed on 5 Apr. 2022, which claims the benefit of U.S. Provisional Application No. 63/171,210 filed 6 Apr. 2021, and U.S. Provisional Application No. 63/268,715 filed 1 Mar. 2022, all of which are hereby incorporated by reference in their entirety.

TECHNICAL FIELD

This disclosure pertains to systems, methods, and media for encoding of envelope information.

BACKGROUND

Audio content may be encoded at relatively low bitrates in various scenarios, for example, to minimize bandwidth. In some cases, audio signals may be encoded at a relatively low bitrate by generating downmix signals associated with downmix channels that effectively reduce a number of audio channels in the encoded audio stream. While this is efficient from a bitrate perspective, audio quality may suffer. For example, although energy information associated with envelopes of frequency bands and/or time windows of the audio signal is encoded to some degree in the downmix signals, low bitrate encoding may cause this energy information to be encoded relatively imprecisely, which can degrade audio quality. Accordingly, improved methods for encoding envelope information are desired.

NOTATION AND NOMENCLATURE

Throughout this disclosure, including in the claims, the terms “speaker,” “loudspeaker” and “audio reproduction transducer” are used synonymously to denote any sound-emitting transducer or set of transducers. A typical set of headphones includes two speakers. A speaker may be implemented to include multiple transducers, such as a woofer and a tweeter, which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation “on” a signal or data, such as filtering, scaling, transforming, or applying gain to, the signal or data, is used in a broad sense to denote performing the operation directly on the signal or data, or on a processed version of the signal or data. For example, the operation may be performed on a version of the signal that has undergone preliminary filtering or pre-processing prior to performance of the operation thereon.

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term “processor” is used in a broad sense to denote a system or device programmable or otherwise configurable, such as with software or firmware, to perform operations on data, which may include audio, or video or other image data. Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods. Some methods may involve determining at least one first downmixed signal associated with at least one downmixed channel associated with a first frame of an audio signal to be encoded. Some methods may involve determining energy levels of the at least one first downmixed signal for a plurality of frequency bands. Some methods may involve determining whether to encode information indicative of the energy levels in a bitstream. Some methods may involve encoding the determined energy levels responsive to a determination that information indicative of the energy levels is to be encoded in the bitstream. Some methods may involve generating an energy control value indicating that energy levels are encoded in the bitstream. Some methods may involve generating the bitstream that includes an encoded version of the at least one first downmixed signal, the energy control value, the information indicative of the energy levels, and metadata usable to upmix the first downmixed signal by a decoder, wherein the energy control value and the information indicative of the energy levels are usable by the decoder to adjust energy levels associated with the at least one first downmixed signal.

In some examples, determining whether to encode the information indicative of the energy levels in the bitstream is determined based at least in part on a number of bits required to encode the at least one first downmixed signal and a number of bits required to transmit the metadata usable to upmix the at least one first downmixed signal.

In some examples, determining whether to encode the information indicative of the energy levels in the bitstream is determined based at least in part on whether the first frame of the audio signal includes a transient.

In some examples, the energy control value indicates a manner in which the energy levels are encoded in the bitstream. In some examples, the manner in which the energy levels are encoded in the bitstream comprise one of time-differential encoding or frequency-differential encoding. In some examples, frequency-differential encoding is utilized to encode energy levels responsive to a determination that a preceding frame included a transient.

In some examples, some methods may further involve applying a delay prior to determining the energy levels of the at least one first downmixed signal for the plurality of frequency bands. In some examples, the delay corresponds to a delay associated with a core encoder that generates the encoded version of the at least one first downmixed signal and a core decoder that reconstructs the audio signal.

In some examples, the encoded version of the at least one first downmixed signal includes energy data that is at least partially redundant with the information indicative of the energy levels included in the bitstream.

In some examples, some methods may further involve: determining whether to encode information indicative of energy levels associated with a second downmixed signal corresponding to a second frame of the audio signal; and responsive to a determination that information indicative of the energy levels associated with the second frame of the audio signal are not to be encoded, generating a second energy control value associated with the second frame that indicates that the information indicative of the energy levels are not included in the bitstream. In some examples, the second energy control value indicates that energy correction gains associated with a previous frame are to be used by the decoder to adjust energy levels associated with the second downmixed signal corresponding to the second frame. In some examples, the second energy control value indicates that the decoder is not to adjust energy levels associated with the second downmixed signal corresponding to the second frame.

In some examples, the at least one downmixed signal comprises two or more downmixed signals.

Some methods may involve obtaining, from a bitstream, a downmixed signal, metadata for upmixing the downmixed signal, and an energy control value indicative of whether energy levels are encoded in the bitstream. Some methods may involve determining a mixing matrix based on the metadata. Some methods may involve determining energy levels of the downmixed signal for a plurality of frequency bands. Some methods may involve determining correction gains to be applied to the mixing matrix based on the determined energy levels for the plurality of frequency bands and the energy control value. Some methods may involve applying the correction gains to the mixing matrix to generate an adjusted mixing matrix. Some methods may involve upmixing the downmixed signal using the adjusted mixing matrix to generate a reconstructed audio signal.

In some examples, the energy control value indicates that the energy levels are encoded in the bitstream, and wherein determining the correction gains is based on the energy levels encoded in the bitstream. In some examples, the energy control value indicates a manner in which the energy levels are encoded in the bitstream. In some examples, the manner in which the energy levels are encoded in the bitstream comprises one of time-differential encoding or frequency-differential encoding.

In some examples, the energy control value indicates that energy levels are not encoded in the bitstream and that energy levels associated with a previous frame are to be used, and wherein determining the correction gains to be applied to the mixing matrix comprises obtaining correction gains applied to the previous frame.

In some examples, the energy control value indicates that energy levels are not encoded in the bitstream, and wherein determining the correction gains to be applied to the mixing matrix comprises fading correction gains applied to a previous frame toward a unity gain.

In some examples, some methods may further involve generating the mixing matrix to be applied to an entirety of the frame using a linear interpolation of parameters applicable to a previous frame and parameters applicable to the frame.

In some examples, a bitrate associated with the bitstream is less than about 40 kilobits per second (kbps).

In some examples, some methods may further involve causing a representation of the reconstructed audio signal to be presented via a loudspeaker or headphones.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via an apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1:
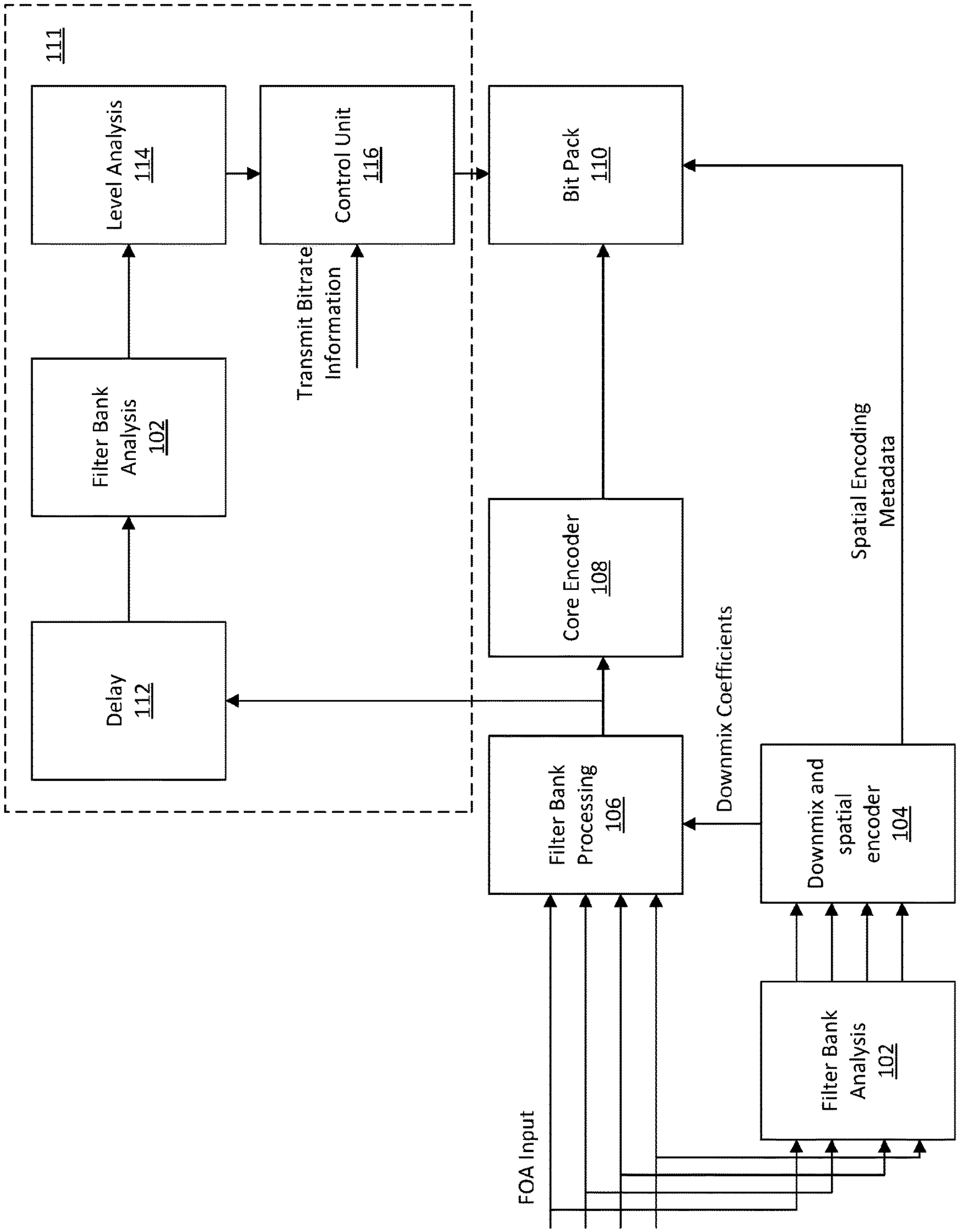
FIG. 1 is a schematic block diagram of a system for encoding envelope energy information in accordance with some embodiments.

Audio signals may be downmixed and encoded, for example, to reduce the bitrate of a transmitted audio signal. In such cases, the encoded downmixed signal inherently includes envelope energy information, e.g., which indicates amplitudes associated with various frequency bands and time windows. However, particularly at low bitrates and/or for high frequencies, this envelope energy information may not be accurately encoded and conveyed to the decoder device. In such instances, when the decoder device reconstructs the downmixed signal, the reconstructed audio signal may not accurately represent the envelope energies, particularly at higher frequencies. This may cause the reconstructed audio signal, when presented, to suffer from various audio quality degradations, such as dullness, lack of ambiance, and/or a generally weak sound or level. Disclosed herein are techniques for correcting energy levels that allow for a reconstructed audio signal to have corrected energy levels that more accurately represent the energy levels associated with the original audio signal. In particular, the techniques disclosed herein involve encoding envelope energy information associated with the downmixed signal and including this envelope energy information in a transmitted bitstream. In other words, because the downmixed signal inherently includes the envelope energy information, in some cases, the bitstream may include redundant envelope energy information that is separately and explicitly encoded in the bitstream. The envelope energy information may then be used by a decoder device to determine correction gains to be applied when upmixing the downmixed signal. For example, the correction gains may be determined such that energy levels associated with the downmixed signal received by the decoder are brought into alignment with the redundant envelope energy information included in the bitstream, thereby correcting the energy levels at the decoder. The techniques disclosed herein may be advantageous, for example, in instances in which the decoder performs a parametric spatial upmixing procedure that relies on correct time and frequency envelope information. Moreover, the techniques described herein may be advantageous at relatively low bitrates, such as lower than about 50 kilobits per second (kbps), lower than about 40 kbps, lower than about 32 kbps, or the like. It should be noted that although the techniques described herein are generally described as encoding envelope energy information associated with a downmixed signal, in some implementations, the techniques described herein may be utilized to encode envelope energy information for multiple downmixed signals, such as two, three, etc. downmixed signals. In one example, envelope energy information may be encoded for two downmixed signals, which may then be used to reconstruct, e.g., 5.1 surround channels.

In some implementations, the envelope energy levels associated with an audio signal are selectively encoded for a particular frame of the audio signal. In other words, the encoder may make a determination of whether or not the envelope energy levels are to be included in the bitstream. Such a determination may be based on a number of bits allocated to encoding the downmixed signal and/or metadata usable to upmix the downmixed signal. In other words, the encoder may determine whether to encode the envelope energy levels based on a determination of whether there are sufficient bits available to encode the energy levels. In some implementations, a determination of whether to encode the envelope energy levels may be made based on whether the current frame includes a transient. For example, envelope energy levels may not be included in connection with frames that include a transient, thereby preventing the decoder from over-correcting energy levels responsive to the transient. In some implementations, the encoder may determine a manner in which the envelope energy levels are to be transmitted, for example, using time-differential Huffman encoding or frequency-differential Huffman encoding. In some embodiments, whether envelope energy levels are encoded in the bitstream, and, if the envelope energy levels are encoded in the bitstream, a manner in which the energy levels are encoded, may be indicated in an energy control value that is included in the transmitted bitstream. The energy control value may then be used by the decoder to determine whether energy levels are included in the bitstream, and, if so, how to use the energy levels. In some implementations, by selectively transmitting envelope energy information, the techniques described herein may improve audio quality, particularly at low bitrates, while preserving bits for encoding downmixed signals and associated metadata.

It should be noted that although the techniques for encoding envelope information are generally described with respect to encoding first order Ambisonics (FOA) and/or higher order Ambisonics (HOA) signals, the techniques for encoding envelope information may be used in connection with encoding any other suitable channel-based audio. In particular, the techniques may be useful for parametric spatial encoding techniques where a subset of the channels are transmitted as downmix channels, and wherein the full set of channels may be reconstructed based on the downmix channels. In some cases, the bitrate needed for encoding envelope information may scale with the number of downmix channels, whereas the importance of accurately encoding downmix energies increases with the number of channels that are to be reconstructed by the decoder. Examples of parametric spatial codecs other than for coding FOA and HOA that may be utilized include MPEG Parametric Stereo (HE-AACv2), MPEG Surround, and AC-4 Advanced Coupling.

Referring to FIG. 1, in a conventional encoding technique, a first order Ambisonics (FOA) or higher order Ambisonics (HOA) signal is processed using a filter bank analysis block 102. Filter bank analysis block 102 may perform frequency analysis using, for example, a fast Fourier transform (FFT) or the like. Frequency analysis may be performed in connection with any suitable number of frequency bands, e.g., 8, 12, 16, etc. Based on the frequency information generated by filter bank analysis block 102, downmix coefficients are determined by downmix and spatial encoder block 104. Additionally, metadata, sometimes referred to as "side information," may be generated by downmix and spatial encoder block 104, where the metadata is usable by a decoder to reconstruct the audio signal, as discussed below in more detail. In some examples, downmix and spatial encoder 104 may utilize the Spatial Reconstruction (SPAR) technique. SPAR is further described in D. McGrath, S. Bruhn, H. Purnhagen, M. Eckert, J. Torres, S. Brown, and D. Darcy *Immersive Audio Coding for Virtual Reality Using a Metadata-assisted Extension of the 3GPP EVS Codec* IEEE International Conference on Acoustics, Speech and Signal Processing (ICASSP), 2019, pp. 730-734, which is hereby incorporated by reference in its entirety. In other examples, spatial encoding block 204 may utilize any other suitable linear predictive codec of energy compacting transform, such as a Karhunen-Loeve Transform (KLT) or the like. Both the original FOA/HOA signal and the downmix coefficients are processed by filter bank processing block 106, which may utilize the same frequency bands as filter bank analysis block 102. It should be noted that although FIG. 1 illustrates an instance in which the FOA/HOA signal is processed by filter bank processing block 106 to construct what is generally referred to herein as an active downmix, the techniques described herein for encoding envelope information may be applied to a passive downmix. As used herein, a passive downmix refers to a context in which downmix coefficients are not processed through a filter bank such as filter bank processing block 106, but rather, may be a selected FOA/HOA input channel. An example of an FOA/HOA input channel that may be selected is an omnidirectional W channel. Alternatively, in some implementations, a passive downmix may generated by a static linear combination of selected input channels.

The output of filter bank processing block 106 is a set of downmix signal(s) corresponding to one or more downmix channels. The downmix signal is provided to core encoder 108, which encodes the downmix signal(s). In some examples, core encoder 108 may utilize the Enhanced Voice Services (EVS) codec. Other example codecs include Advanced Audio Coding (AAC), HE-AAC, Opus, or the like. A bit packing block 110 generates a bitstream that includes the encoded downmix signal(s) and the metadata generated by downmix and spatial encoder 104. The encoded downmix signals may be considered waveform encoded, whereas the metadata may be considered parametrically encoded.

Because the downmix coefficients are generated using filter bank analysis block 102, and the downmix signal(s) are generated using the downmix coefficients and further filter bank processing that utilizes the same frequency bands as that used by filter bank analysis block 102, the encoded downmix signals inherently may include some envelope energy information. However, particularly at relatively lower bit rates, this envelope energy information may not be precisely encoded in the resulting bitstream. The impreciseness of the encoded envelope energy information inherent in the encoding of the downmix signals may lead to poor audio quality, particularly at relatively lower bit rates.

Disclosed herein are techniques for encoding envelope energy information, in particular, in a manner that is at least somewhat redundant to the envelope energy information inherently encoded in connection with the downmix signals. By encoding at least partially redundant envelope energy information, a decoder device may be able to utilize the envelope energy information to correct gains prior to upmixing the audio signal, thereby allowing improved audio quality even under low bitrate conditions. Moreover, as will be described below in more detail, envelope encoding information may be selectively encoded on a per-frame basis, where a determination of whether to encode the envelope energy information for a particular frame, and a manner in which envelope energy information is encoded, may be made based on various criteria, such as whether a transient is included in the frame, a number of bits required to encode the downmix signals and/or spatial metadata, and the like. By selectively encoding envelope energy information, envelope energy information may be provided in connection with frames for which the envelope energy information is most useful, while preserving bitrate for encoding the downmix signals. In other words, the techniques describe herein allow a low bitrate signal to be optimally encoded to improve audio quality.

Referring back to FIG. 1, a modification to the conventional system described above for encoding envelope energy information is shown in panel 111. In particular, the downmix signals may be delayed by a delay block 112. The delay applied to the downmix signals may correspond to a delay that is associated with the total delay of core encoder 108 and a core decoder of the decoder device, e.g., core decoder 204, as shown in and described below in connection with FIG. 2, such that the waveform for which envelope energy information is determined by level analysis block 114 is time aligned with the decoded downmix signals as output from the core decoder of the decoder device and encoded by core encoder 108. In other words, the encoded level data is time aligned with the audio decoded by the core decoder of the decoder device (e.g., core decoder 204 of FIG. 2). By way of example, in an instance in which the EVS codec is utilized by core encoder 108, a delay of 12 milliseconds may be applied by the EVS codec to each frame. Continuing with this example, delay block 112 may apply a corresponding 12 milliseconds delay to the downmix signals received by delay block 112 such that envelope energy information is calculated for downmix signals that are time-aligned with those encoded by the EVS codec by core encoder 108 and decoded by the core decoder 204.

The delayed downmix signal is then processed using filter bank analysis block 102. In other words, the same frequency bands used to generate the downmix signals are used to process the delayed downmix signals. The frequency information is then provided to level analysis block 114, which generates envelope energy information based on the frequency information. It should be noted that, in some implementations, the corresponding filter bands may be utilized by the decoder to reconstruct the audio channels.

As described above, a determination of whether to encode the envelope energy information is made, and, if the envelope energy information is to be encoded, a manner in which the envelope energy information is to be encoded is determined. This determination may be made by a control unit 116, which takes, as input, the envelope energy information generated by level analysis block 114 and bitrate information. In some embodiments, control unit 116 may determine whether the envelope energy information is to be encoded based on the bitrate information and/or whether a transient is present in the current frame of the audio signal. For example, control unit 116 may determine that the envelope energy information is not to be encoded in response to determining that there are not enough bits to encode the envelope energy information based on a number of bits required to encode the downmix signal by core encoder 108 and/or a number of bits required to encode the spatial encoding metadata. As another example, control unit 116 may determine that the envelope energy information is not to be encoded in response to determining that a transient is present in the current frame of the audio signal. In some embodiments, control unit 116 may determine that, in instances in which the envelope energy information is not to be encoded, the decoder is to either not apply any corrective gains to the envelope of the decoded frame, or, alternatively, that the decoder is to apply the corrective gains associated with the preceding frame of the audio signal. In some implementations, in instances in which the envelope energy information is to be encoded, control unit 116 may determine a manner in which the envelope energy information is to be encoded. For example, control unit 116 may determine whether time-differential Huffman encoding or frequency-differential Huffman encoding is to be used. As a more particular example, in some implementations, control unit 116 may determine that frequency-differential Huffman encoding is to be used to encode envelope energy information associated with a frame after a frame with a transient present, and is to use time-differential Huffman encoding in connection with other frames. In some implementations, control unit 116 may select an entropy coding method from a set of candidate entropy coding methods. In some embodiments, the entropy coding method may be selected as the entropy coding method which utilizes the fewest number of bits to encode envelope information. It should be noted that although time-differential Huffman encoding and frequency-differential Huffman encoding are generally described herein, in some implementations, any suitable entropy coding technique may be used, such as arithmetic coding.

In some implementations, control unit 116 may generate an energy control value that indicates whether the envelope energy information is included in the bitstream, and, if the envelope energy information is encoded, a manner in which the envelope energy information is encoded. By way of example, in some implementations, the energy control value may be a 2-bit value. As a specific example, the energy control value may indicate a manner of encoding the envelope energy information as follows: 00=no corrective gains are to be applied; 01=corrective gains applied to the preceding frame are to be applied to the present frame; 10=time-differential Huffman encoding; and 11=frequency-differential Huffman encoding.

It should be noted that any of the blocks shown in FIG. 1 may be implemented using the control system shown in and described below in connection with FIG. 6. For example, any of filter bank analysis block 102, downmix and spatial encoder 104, filter bank processing block 106, core encoder 108, bit packing block 110, core encoder delay block 112, level analysis block 114, and/or control unit 116 may be implemented using one or more instances of the control system shown in and described below in connection with FIG. 6.

In some implementations, a decoder may receive a bitstream that includes encoded downmixed signals, encoded metadata usable for upmixing the downmixed signals, and an energy control value that indicates whether envelope energy information is encoded in the bitstream, and, if so, a manner in which the envelope energy information is encoded. The decoder may then generate a mixing matrix based on the metadata, where the mixing matrix is used to upmix the downmixed signal. In some implementations, the decoder may determine energy levels for the downmixed signal, and subsequently determine correction gains to be applied to the mixing matrix based on the energy levels associated with the downmixed signal and the energy control value included in the bitstream. For example, based on the energy control value, the decoder may determine that the correction gains are to fade to unity, that correction gains from the preceding frame are to be used for the current frame, and/or that correction gains are to be determined based on envelope energy information values included in the bitstream. The decoder may then apply the correction gains to the mixing matrix to generate an adjusted mixing matrix. The decoder may then upmix the downmixed signal using the adjusted mixing matrix, thereby adjusting energy levels of the reconstructed audio signal to be in line with those of the input audio signal processed by the encoder.

Figure 2:
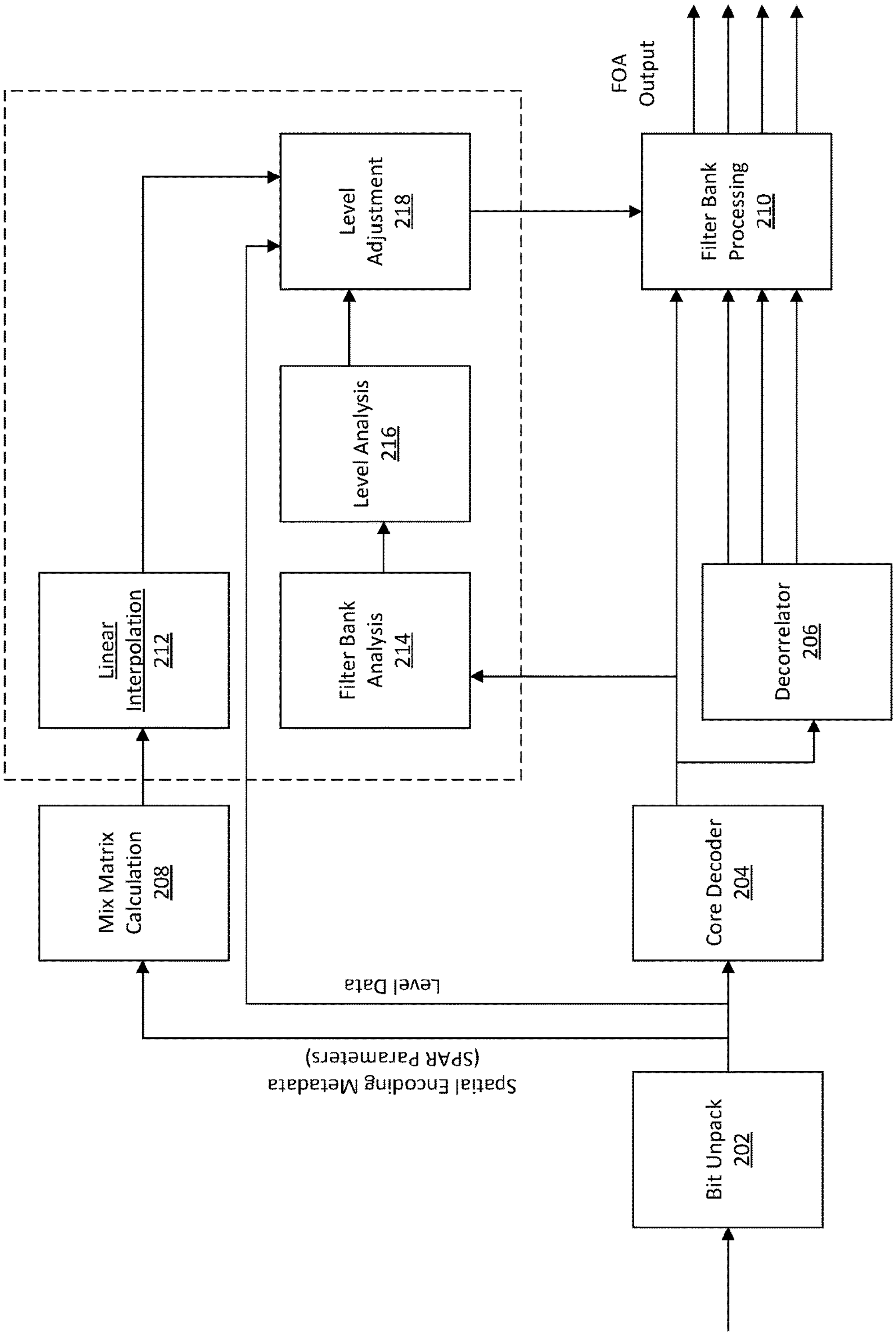
FIG. 2 is a schematic block diagram of a system for decoding and utilizing envelope energy information in accordance with some embodiments.

FIG. 2 shows an example of a system that may be implemented on a decoder device for correcting gains based on encoded envelope energy information in accordance with some embodiments. The decoder device may receive a bitstream, and, using bit unpacking block 202, unpack the bitstream. The unpacked bitstream may include spatial encoding metadata associated with parametrically encoded channels, an energy control value that indicates whether envelope energy information is included in the bitstream, level data associated with envelope energy information if included in the bitstream, and encoded downmixed signals corresponding to waveform-encoded channels. The encoded downmixed signals may be provided to a core decoder 204, which may decode the downmixed signal. In some implementations, core decoder 204 may utilize the EVS codec to decode the downmixed signal. The downmixed signal may then be provided to a decorrelator 206. Decorrelator 206 may generate multiple (e.g., 3, 4, etc.) decorrelated versions of the downmixed signal.

The spatial encoding metadata unpacked from the bitstream is utilized by a mix matrix calculation block 208 to generate a mixing matrix. In an instance in which the input audio signal has 4 channels, such as first order Ambisonics W, X, Y, and Z channels, the mixing matrix is a 4×4 matrix. The matrices may be determined on a per-frequency band basis. The mixing matrix is typically applied in such a way that the mixing corresponds to the matching time in the decoded audio signal after taking into account taking the core encoder delay, the core decoder delay, and the filterbank processing delay. Thus the parameter cross-fading between the previous frame parameters and the current frame parameters, which is utilized for smooth transition between different parameter sets, is applied within the currently decoded audio frame using the mixing matrix. Typically, the cross-faded mixing matrix is then utilized in connection with the downmixed signal and the decorrelated versions of the downmixed signal to generate a reconstructed FOA signal.

In the techniques described herein, the mixing matrix may be modified based on correction gains. Referring to FIG. 2, in some implementations, the decoded downmixed signal generated by core decoder 204 is provided to a filter bank analysis block 214. Filter bank analysis block 214 may determine frequency information associated with the decoded downmixed signal using the same frequency bands as those used by the encoder, as shown in and described above in connection with FIG. 1. The frequency information may then be utilized by level analysis block 216 to determine envelope energy information for the decoded downmixed signal. The envelope energy information is then provided to level adjustment block 218.

It should be noted that in conventional use of the SPAR system, the mixing matrices from both the current frame and the previous frame are used to decode the current frame. This is because the mixing matrices of the current frame and the previous frame are related to different portions of the current frame to be processed. However, when applying correction gains using envelope energy information as in the techniques described herein, correction gains can be determined for the current audio frame, and may not be determined for parts of the yet unavailable frame data the current mixing matrix also pertains to. Therefore, to apply energy correction gains, a different approach than the cross-fading technique described above may be used. In some embodiments, a mixing matrix associated with the current decoded audio frame is determined by linear interpolation block 212. In some implementations, the mixing matrix may be determined using linear interpolation between the previous mixing parameters and the current mixing parameters. The mixing matrix, determined using linear interpolation, may then be modified based on the energy correction gains. In some implementations, the cross-fade between the previous mixing parameters and the current mixing parameters may be done at the beginning of the frame. This way, energy correction information and mixing information are time-aligned to the current frame. In some embodiments, a slight mismatch between transmitted mixing parameters and applied mixing parameters may be acceptable. The mixing matrix may then be provided to level adjustment block 218.

Level adjustment block 218 may receive level data obtained from the unpacked bitstream. The level data may include an energy control value that indicates whether envelope energy information is additionally included in the bitstream, and, if included, a manner in which the envelope energy information is encoded. For example, the energy control value may indicate that no correction gains are to be applied, or that correction gains associated with the preceding frame are to be applied to the current frame, and thus, envelope energy information is not included in the bitstream. As another example, the energy control value may indicate that envelope energy information is included in the bitstream and was determined using time-differential Huffman encoding or frequency-differential Huffman encoding.

Level adjustment block 218 may determine correction gains based on the level data. For example, in an instance in which the energy control value indicates that correction gains are not to be applied, level adjustment block 218 may generate correction gains that fade to a unity gain (e.g., 1.0) using, e.g., a first order recursive low-pass filter. It should be noted that level adjustment block 218 may utilize a fade to unity gain in an instance in which one or more packets are determined to have been lost or dropped in transmission from the encoder device. As another example, in an instance in which the energy control value indicates that corrections gains associated with the preceding frame are to be applied to the current frame, level adjustment block 218 may retrieve the previously used correction gains. As yet another example, level adjustment block 218 may determine the correction gains based on the envelope energy information included in the bitstream and the envelope energy information determined by level analysis block 216. As a more particular example, the determined correction gains may bring the energies determined by level analysis block 216 into alignment with the energies included in the bitstream. In some embodiments, the correction gains may be determined subject to any suitable maximum and minimum gains. In one example, a minimum correction gain may be about 0, 6, 0.7, 0.8, or the like, and a maximum correction gain may be about 1.3, 1.4, 1.5, or the like. It should be noted that determined correction gains may be stored, e.g., in internal state memory, for use when processing a subsequent frame. Level adjustment block 218 may apply the correction gains, whether determined based on envelope energy information included in the bitstream or not, to the mixing matrix to generate an adjusted mixing matrix.

The adjusted mixing matrix may then be provided to filter bank processing block 210 in connection with the downmixed signal and the decorrelated versions of the downmixed signal for generating a reconstructed audio signal. In other words, rather than using the original mixing matrix, the adjusted mixing matrix, having been adjusted based on correction gains that reflect envelope energy information, is used to reconstruct the audio signal, thereby allowing the reconstructed audio signal to more faithfully represent energy information, particularly at high frequency bands.

It should be noted that any of the blocks shown in FIG. 2 may be implemented using the control system shown in and described below in connection with FIG. 6. For example, any of bit unpacking block 202, core decoder 204, decorrelator 206, mix matrix calculation block 208, filter bank processing block 210, fractional delay block 212, filter bank analysis block 214, level analysis block 216, and/or level adjustment block 218 may be implemented using one or more instances of the control system shown in and described below in connection with FIG. 6.

Figure 3:
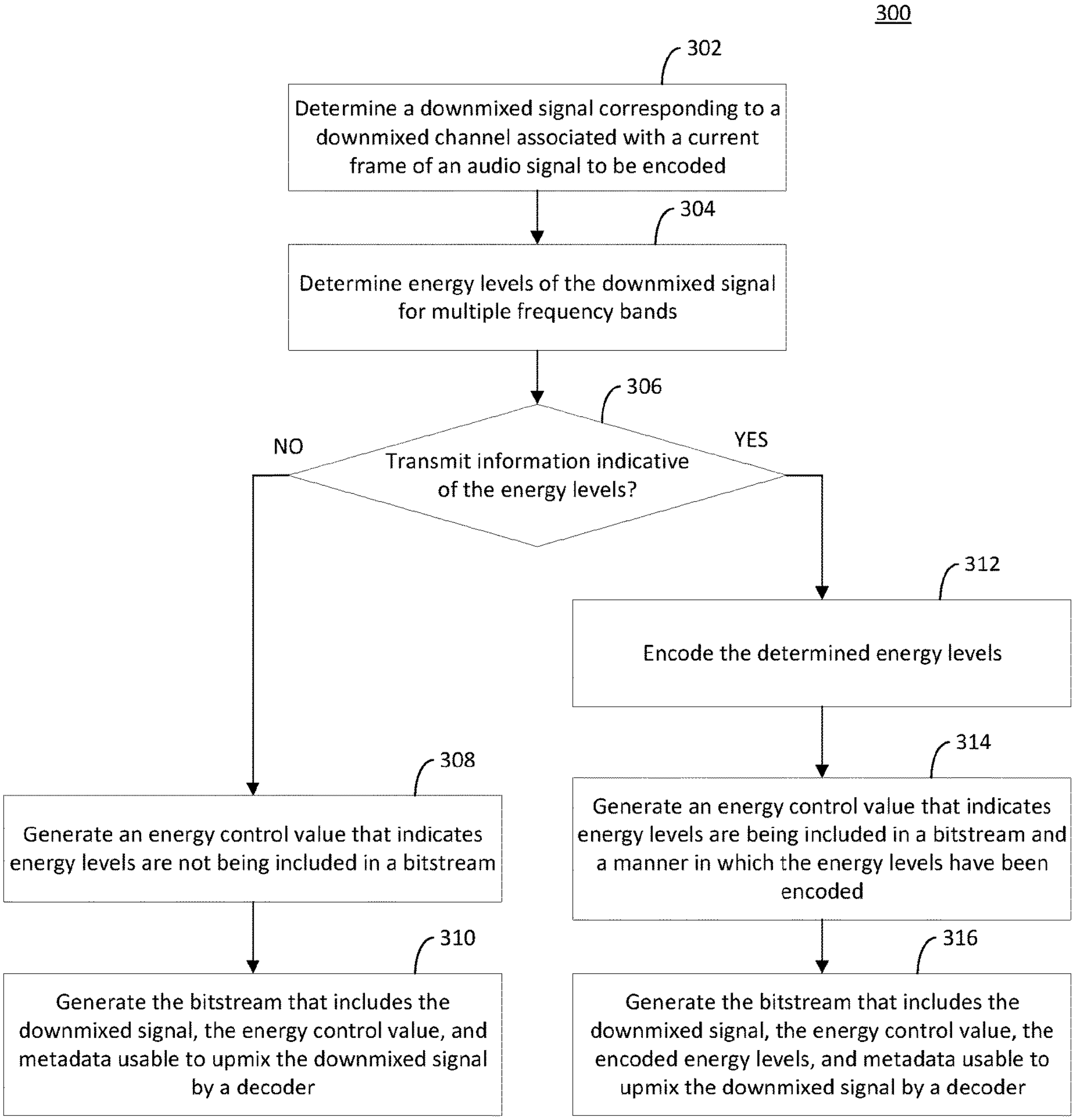
FIG. 3 is a flowchart of an example process that may be performed by an encoder for implementing encoding of envelope energy information in accordance with some embodiments.

Turning to FIG. 3, a flowchart of an example process 300 for utilizing envelope energy information associated with an audio signal is shown in accordance with some implementations. In some embodiments, blocks of process 300 may be executed by an encoder device and/or a control system associated with an encoder device. Components of such a control system are shown in and described below in connection with FIG. 6. In some implementations, blocks of process 300 may be executed in an order other than that shown in FIG. 3. In some embodiments, two or more blocks of process 300 may be executed substantially in parallel. In some embodiments, one or more blocks of process 300 may be omitted.

Process 300 can begin at 302 by determining a downmixed signal corresponding to a downmixed channel associated with a current frame of an audio signal to be encoded. As described above in connection with FIG. 1, process 300 may determine the downmixed signal by performing frequency analysis on the audio signal. For example, the audio signal may be analyzed using a filter bank corresponding to any suitable number of frequency bands. Continuing with this example, the downmixed signal may be determined using downmix coefficients generated by a spatial encoder, such as a SPAR encoder. Note that, in addition to determining the downmixed signal, process 300 may additionally determine metadata, such as spatial encoding metadata, which may be usable by a decoder to upmix the downmixed signal.

At 304, process 300 may determine energy levels of the downmixed signal for multiple frequency bands. For example, as described above in connection with FIG. 1, process 300 may determine the energy levels using a filter bank having the same frequency bands as those used to generate the downmixed signal. Continuing with this example, the energy levels may be determined for at least a subset of the frequency bands associated with the filter bank. For example, in some embodiments, the subset of the frequency bands may correspond to the relatively higher frequency bands, such as the 8 highest frequency bands out of 12 frequency bands, the 9 highest frequency bands out of 16 frequency bands, the 12 highest frequency bands out of 16 frequency bands, or the like. It should be noted that, as described above in connection with FIG. 1, the downmixed signal may be delayed by a duration corresponding to a delay associated with a core encoder and decoder used to encode the downmixed signal prior to determining the energy levels. Such a delay may serve to ensure that any transmitted envelope energy information is time-aligned with the downmixed signal encoded by the core encoder.

At 306, process 300 can determine whether to transmit information indicative of the energy levels, e.g., by including the information indicative of the energy levels in a transmitted bitstream. In some implementations, process 300 may determine whether to transmit the information indicative of the energy levels based on whether the current frame of the audio signal includes a transient. In one example, process 300 may determine the information indicative of the energy levels is not to be transmitted responsive to determining that the current frame of the audio signal includes a transient. In some implementations, process 300 may determine whether to transmit the information indicative of the energy levels based on a number of bits to be used to encode the downmixed signal by the core encoder and a number of bits to be used to encode the metadata to be used to upmix the downmixed signal. For example, in some embodiments, process 300 may determine, based on the bitrate, a maximum number of bits that may be used in connection with the current audio frame. Continuing with this example, process 300 may determine a sum of the number of bits to be used to encode the downmixed signal and the number of bits to be used to encode the metadata. Continuing still further with this example, process 300 may determine that the information indicative of the energy levels is to be transmitted if the sum of the number of bits to be used to encode the downmixed signal and the number of bits to be used to encode the metadata is less than the maximum number of bits that may be used in connection with the current audio frame. Conversely, process 300 may determine that the information indicative of the energy levels is not to be transmitted if the sum of the number of bits to be used to encode the downmixed signal and the number of bits to be used to encode the metadata exceeds the maximum number of bits that may be used in connection with the current audio frame.

If, at 306, process 300 determines that the information indicative of the energy levels is not to be transmitted ("no" at 306), process 300 can proceed to block 308 and can generate an energy control value that indicates energy levels are not included in the bitstream. In some implementations, the energy control value may indicate that energy levels are not included in the bitstream, and no correction gains are to be applied by the decoder. In other words, such an energy control value may indicate that the decoder is not to adjust energy levels of the signal. For example, the energy control value may indicate that no correction gains are to be applied by the decoder responsive to a determination that the current frame of the audio signal includes a transient. As another example, in some implementations, the energy control value may indicate that energy level information is not included in the bitstream, and that energy levels associated with a preceding frame are to be used by the decoder to adjust energy levels of the current frame. As a more particular example, the energy control value may indicate that correction gains associated with the preceding frame are to be used in association with the current frame. As described above in connection with FIG. 1, the energy control value may be a two-bit value.

At 310, process 300 can generate the bitstream that includes the downmixed signal, the energy control value, and the metadata usable by the decoder to upmix the downmixed signal.

Conversely, if, at 306, process 300 determines that the information indicative of the energy levels is to be transmitted ("yes" at 306), process 300 can proceed to block 312 and can encode the determined energy levels. In some implementations, process 300 may determine a manner in which the energy levels are to be encoded. For example, in some implementations, process 300 may determine whether the energy levels are to be encoded using time-differential Huffman encoding or using frequency-differential Huffman encoding. In one example, process 300 may determine that the energy levels are to be encoded using frequency-differential Huffman encoding responsive to a determination that the current frame is a frame that is immediately after a frame for which energy levels were not transmitted, e.g., due to the preceding frame including a transient. In some examples, time-differential Huffman encoding may be utilized in other cases.

It should be noted that, in some implementations, energy levels may be encoded only for particular frequency bands. For example, because the encoded downmixed signal may adequately include sufficient envelope energy information for relatively low frequencies, in some implementations, process 400 may encode energy levels for relatively higher frequencies. In one example, energy levels may be encoded for frequencies higher than 1200 Hz, higher than 1500 Hz, higher than 2000 Hz, or the like.

At 314, process 300 may generate an energy control value that indicates energy levels are being included in the bitstream and a manner in which the energy levels have been encoded. For example, the energy control value can indicate whether time-differential Huffman encoding or frequency-differential encoding was used at block 312.

As described above in connection with FIG. 1, the energy control value may be a 2-bit number. Referring to FIG. 1 and to block 308, example values of the energy control value include: 00=no corrective gains are to be applied; 01=corrective gains applied to the preceding frame are to be applied to the present frame; 10=time-differential Huffman encoding; and 11=frequency-differential Huffman encoding.

Figure 5:
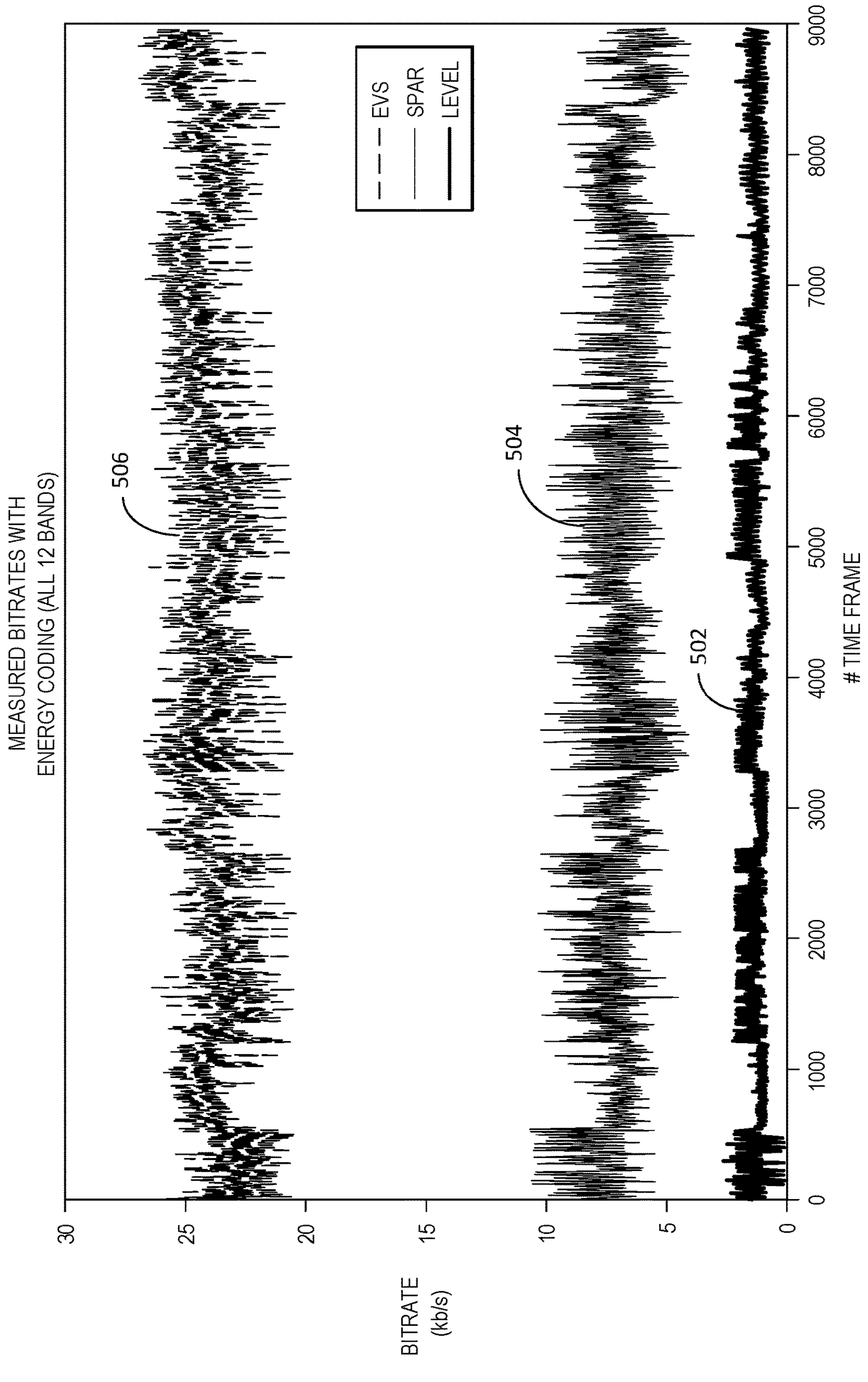
FIG. 5 is a graph that illustrates varying bitrates of an audio signal when envelope energy information is encoded on a per-frame basis in accordance with some embodiments.

At 316, process 300 may generate the bitstream that includes the downmixed signal, the energy control value, the encoded energy levels, and metadata usable to upmix the downmixed signal. It should be noted that the generated bitstream may be subject to any suitable bitrate limit such that the total bits used to encode the downmixed signal, the energy control value, the encoded energy levels, and the metadata satisfy the maximum number of bits allocated to the frame, as described above in connection with block 306. FIG. 5 shows an example of the number of bits allocated to the downmixed signal, the energy levels, and the metadata varying for different frames of the audio signal.

Figure 4:
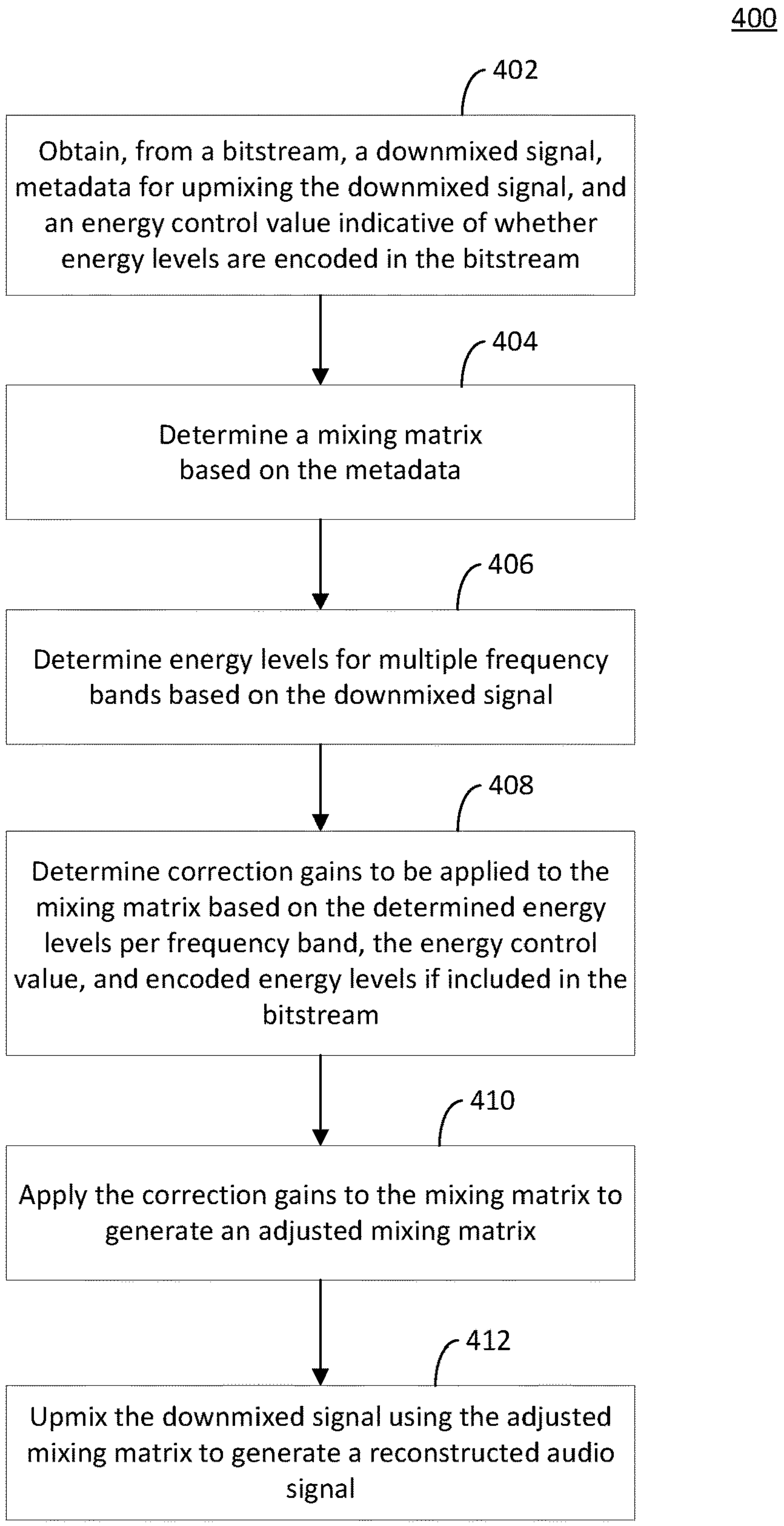
FIG. 4 is a flowchart of an example process that may be performed by a decoder for implementing decoding and utilization of envelope energy information in accordance with some embodiments.

Turning to FIG. 4, a flowchart of an example process 400 for utilizing envelope energy information associated with an audio signal is shown in accordance with some implementations. In some embodiments, blocks of process 400 may be executed by a decoder device and/or a control system associated with a decoder device. Components of such a control system are shown in and described below in connection with FIG. 6. In some implementations, blocks of process 400 may be executed in an order other than that shown in FIG. 4. In some embodiments, two or more blocks of process 400 may be executed substantially in parallel. In some embodiments, one or more blocks of process 400 may be omitted.

Process 400 can begin at 402 by obtaining a downmixed signal, metadata for upmixing the downmixed signal, and an energy control value indicative of whether energy levels are encoded in the bitstream. The downmixed signal, the metadata, and the energy control value may be obtained from a bitstream and may be application for a current frame of the audio signal. As shown in and described above in connection with FIG. 2, the downmixed signal, the metadata, and the energy control value may be unpacked from the bitstream by the decoder.

At 404, process 400 can determine a mixing matrix based on the metadata. In some implementations, dimensions of the mixing matrix may depend on a number of channels in the original audio signal encoded by an encoder device. In one example, in an instance in which the number of channels in the original audio signal is 4, the mixing matrix may have dimensions of 4×4. The mixing matrix may be generated using a spatial decoder, e.g., that uses SPAR techniques, linear predictive techniques, or the like.

At 406, process 400 can determine energy levels for multiple frequency bands based on the downmixed signal. For example, as shown in and described above in connection with FIG. 2, process 400 may pass the downmixed signal through a filter bank. In some implementations, the frequency bands of the filter bank may correspond to the frequency bands used by the encoder to generate the downmixed signal and/or to generate energy levels associated with the downmixed signal. In some embodiments, process 400 may then determine energy levels based on the filter bank outputs. In some implementations, process 400 may determine energy levels for a subset of the frequency bands represented in the filter bank. For example, the subset of frequency bands may include the relatively higher frequency bands represented in the filter bank.

At 408, process 400 may determine correction gains to be applied to the mixing matrix based on the determined energy levels per frequency band, the energy control value, and the encoded energy levels if included in the bitstream. For example, as described above in connection with FIG. 2, in an instance in which the energy control value indicates that no correction gains are to be applied, process 400 may determine correction gains that effectively fade to a unity gain and apply a fade-to-unity gain to the mixing matrix. As another example, in an instance in which the energy control value indicates that the correction gains applied to the preceding frame are to be applied to the current frame, process 400 may retrieve the correction gains applied to the preceding frame to the mixing matrix. As yet another example, in an instance in which the energy control value indicates that the encoded energy levels are included in the bitstream using time-differential Huffman encoding, process 400 may reconstruct the energy levels by reversing the time-differential Huffman encoding. Continuing with this example, process 400 may determine correction gains that bring the energy levels determined at block 406 into alignment with the reconstructed energy levels. As still another example, in an instance in which the energy control value indicates that the encoded energy levels are included in the bitstream using frequency-differential Huffman encoding, process 400 may reconstruct the energy levels by reversing the frequency-differential Huffman encoding. Continuing with this example, process 400 may determine correction gains that bring the energy levels determined at block 406 into alignment with the reconstructed energy levels.

It should be noted that, in some implementations, process 400 may only determine correction gains for relatively higher frequencies. In other words, because envelope energy information may be adequately encoded for relatively lower frequencies, there may be no need to apply correction gains for the relatively lower frequencies. In some embodiments, correction gains may be applied on a per-frequency band basis for frequencies about 1200 Hz, above 1500 Hz, about 2000 Hz, or the like.

At 410, process 400 can apply the correction gains to the mixing matrix to generate an adjusted mixing matrix. It should be noted that, in some implementations, the mixing matrix may be generated using linear interpolation. The correction gains may then be applied to the mixing matrix.

At 412, process 400 may upmix the downmixed signal using the adjusted mixing matrix to generate a reconstructed audio signal. For example, in some implementations, process 400 may transform the adjusted mixing matrix to the time-domain. Continuing with this example, process 400 may generate the reconstructed audio signal using filter bank processing applied to the downmixed signal, decorrelated versions of the downmixed signal, and the time-domain version of the adjusted mixing matrix, as shown in and described above in connection with FIG. 2.

In some implementations, the reconstructed audio signal may be rendered. For example, rendering the reconstructed audio signal may include allocating components of the reconstructed audio signal to one or more loudspeakers or headphones to create a spatial perception when the rendered audio signal is presented. In some implementations, the rendered audio signal may be presented, for example, by one or more loudspeakers, one or more headphones, or the like.

In some implementations, use of the techniques described above may cause an audio signal to be encoded such that, across the frames of the audio signal, the bitrate used to encode each of the downmixed signal(s), the metadata usable to upmix the downmixed signal, and the envelope energy information vary. However, the total bitrate may be fixed at a constant bitrate. In other words, the number of bits allocated to each of the downmixed signal(s), the metadata, and the envelope energy information may vary subject to a fixed number of total bits for a given frame, thereby allowing the total bitrate to remain fixed. For example, for frames in which no envelope energy information is transmitted, additional bits may be allocated to encode the downmixed signal and/or the metadata. Conversely, for frames in which envelope energy information is transmitted, fewer bits may be allocated to encode the downmixed signal and/or the metadata.

FIG. 5 shows a graph associated with an example audio signal that illustrates varying allocations for encoding a downmixed signal and associated metadata in accordance with some implementations. Curve 502 depicts a bitrate used to encode envelope energy information, curve 504 depicts a bitrate used to encode metadata, and curve 506 depicts a bitrate used to encode the downmixed signal. Note that in the graph shown in FIG. 5, the bitrate used to encode the envelope energy information is indicated across 12 frequency bands. As illustrated in FIG. 5, during time periods in which the bitrate used to encode envelope energy information is relatively lower, the bitrate associated with encoding the downmixed signal and/or the bitrate associated with encoding the metadata is relatively higher. Conversely, during time periods in which the bitrate associated with encoding envelope energy levels is relatively higher, the bitrate associated with encoding the downmixed signal and/or the bitrate associated with encoding the metadata is relatively lower. However, for a given time period, the total bitrate remains constant.

Figure 6:
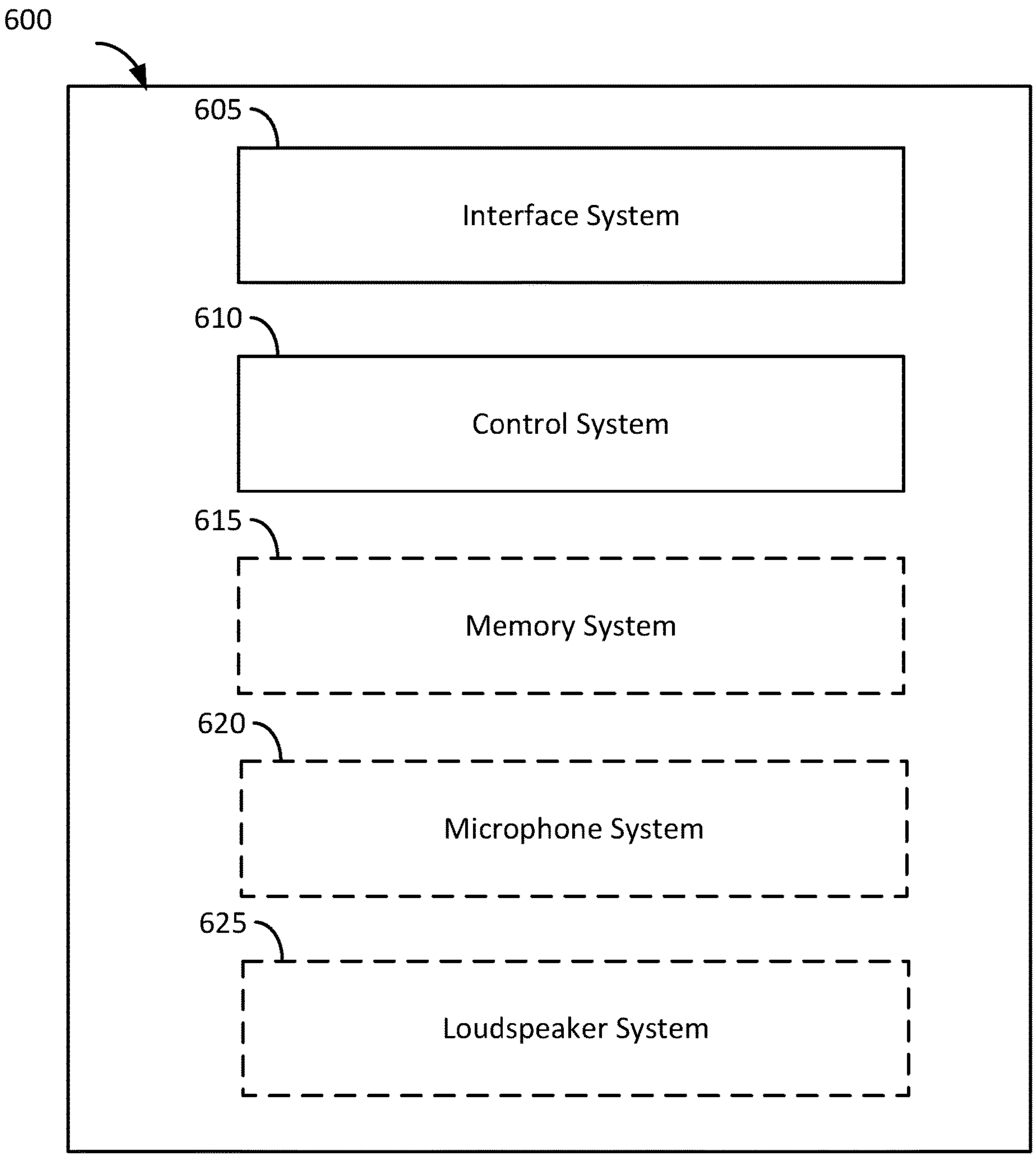
FIG. 6 shows a block diagram that illustrates examples of components of an apparatus capable of implementing various aspects of this disclosure.

FIG. 6 is a block diagram that shows examples of components of an apparatus capable of implementing various aspects of this disclosure. As with other figures provided herein, the types and numbers of elements shown in FIG. 6 are merely provided by way of example. Other implementations may include more, fewer and/or different types and numbers of elements. According to some examples, the apparatus 600 may be configured for performing at least some of the methods disclosed herein. In some implementations, the apparatus 600 may be, or may include, a television, one or more components of an audio system, a mobile device (such as a cellular telephone), a laptop computer, a tablet device, a smart speaker, or another type of device.

According to some alternative implementations the apparatus 600 may be, or may include, a server. In some such examples, the apparatus 600 may be, or may include, an encoder. Accordingly, in some instances the apparatus 600 may be a device that is configured for use within an audio environment, such as a home audio environment, whereas in other instances the apparatus 600 may be a device that is configured for use in "the cloud," e.g., a server.

In this example, the apparatus 600 includes an interface system 605 and a control system 610. The interface system 605 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 605 may, in some implementations, be configured for exchanging control information and associated data with audio devices of the audio environment. The control information and associated data may, in some examples, pertain to one or more software applications that the apparatus 600 is executing.

The interface system 605 may, in some implementations, be configured for receiving, or for providing, a content stream. The content stream may include audio data. The audio data may include, but may not be limited to, audio signals. In some instances, the audio data may include spatial data, such as channel data and/or spatial metadata. In some examples, the content stream may include video data and audio data corresponding to the video data.

The interface system 605 may include one or more network interfaces and/or one or more external device interfaces, such as one or more universal serial bus (USB) interfaces. According to some implementations, the interface system 605 may include one or more wireless interfaces. The interface system 605 may include one or more devices for implementing a user interface, such as one or more microphones, one or more speakers, a display system, a touch sensor system and/or a gesture sensor system. In some examples, the interface system 605 may include one or more interfaces between the control system 610 and a memory system, such as the optional memory system 615 shown in FIG. 6. However, the control system 610 may include a memory system in some instances. The interface system 605 may, in some implementations, be configured for receiving input from one or more microphones in an environment.

The control system 610 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 610 may reside in more than one device. For example, in some implementations a portion of the control system 610 may reside in a device within one of the environments depicted herein and another portion of the control system 610 may reside in a device that is outside the environment, such as a server, a mobile device (e.g., a smartphone or a tablet computer), etc. In other examples, a portion of the control system 610 may reside in a device within one environment and another portion of the control system 610 may reside in one or more other devices of the environment. For example, a portion of the control system 610 may reside in a device that is implementing a cloud-based service, such as a server, and another portion of the control system 610 may reside in another device that is implementing the cloud-based service, such as another server, a memory device, etc. The interface system 605 also may, in some examples, reside in more than one device.

In some implementations, the control system 610 may be configured for performing, at least in part, the methods disclosed herein. According to some examples, the control system 610 may be configured for implementing methods of determining energy encoding control values, encoding energy information decoding energy information, or the like.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 615 shown in FIG. 6 and/or in the control system 610. Accordingly, various innovative aspects of the subject matter described in this disclosure can be implemented in one or more non-transitory media having software stored thereon. The software may, for example, include instructions for energy encoding control values, encoding energy information decoding energy information, etc. The software may, for example, be executable by one or more components of a control system such as the control system 610 of FIG. 6.

In some examples, the apparatus 600 may include the optional microphone system 620 shown in FIG. 6. The optional microphone system 620 may include one or more microphones. In some implementations, one or more of the microphones may be part of, or associated with, another device, such as a speaker of the speaker system, a smart audio device, etc. In some examples, the apparatus 600 may not include a microphone system 620. However, in some such implementations the apparatus 600 may nonetheless be configured to receive microphone data for one or more microphones in an audio environment via the interface system 610. In some such implementations, a cloud-based implementation of the apparatus 600 may be configured to receive microphone data, or a noise metric corresponding at least in part to the microphone data, from one or more microphones in an audio environment via the interface system 610.

According to some implementations, the apparatus 600 may include the optional loudspeaker system 625 shown in FIG. 6. The optional loudspeaker system 625 may include one or more loudspeakers, which also may be referred to herein as "speakers" or, more generally, as "audio reproduction transducers." In some examples, e.g., cloud-based implementations, the apparatus 600 may not include a loudspeaker system 625. In some implementations, the apparatus 600 may include headphones. Headphones may be connected or coupled to the apparatus 600 via a headphone jack or via a wireless connection, e.g., BLUETOOTH.

Some aspects of present disclosure include a system or device configured, e.g., programmed, to perform one or more examples of the disclosed methods, and a tangible computer readable medium, e.g., a disc, which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor, e.g., a personal computer (PC) or other computer system or microprocessor, which may include an input device and a memory, which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements The other elements may include one or more loudspeakers and/or one or more microphones. A general purpose processor configured to perform one or more examples of the disclosed methods may be coupled to an input device. Examples of input devices include, e.g., a mouse and/or a keyboard. The general purpose processor may be coupled to a memory, a display device, etc.

Another aspect of present disclosure is a computer readable medium, such as a disc or other tangible storage medium, which stores code for performing, e.g., by a coder executable to perform, one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. A method for adjusting energy levels of audio signals, the method comprising:

determining a first downmixed signal associated with at least one downmixed channel associated with a first frame of an audio signal to be encoded;

determining energy levels of the first downmixed signal for a plurality of frequency bands;

determining whether to encode information indicative of the energy levels in a bitstream;

responsive to a determination that information indicative of the energy levels is to be encoded in the bitstream, encoding the determined energy levels;

generating an energy control value indicating that energy levels are encoded in the bitstream; and generating the bitstream that includes an encoded version of the first downmixed signal, the energy control value, the information indicative of the energy levels, and metadata usable to upmix the first downmixed signal by a decoder, wherein the information indicative of the energy levels comprises envelope energy information of the first downmixed signal that is at least partially redundant envelope energy information, and wherein the energy control value and the information indicative of the energy levels are for use usable by the decoder to ensure alignment of energy levels associated with the at least one first downmixed signal with the redundant envelope energy information.

2. The method of claim 1, wherein determining whether to encode the information indicative of the energy levels in the bitstream is determined based at least in part on a number of bits required to encode the first downmixed signal and a number of bits required to transmit the metadata usable to upmix the first downmixed signal.

3. The method of claim 1 wherein determining whether to encode the information indicative of the energy levels in the bitstream is determined based at least in part on whether the first frame of the audio signal includes a transient.

4. The method of claim 1, wherein the energy control value indicates a manner in which the energy levels are encoded in the bitstream.

5. The method of claim 4, wherein the manner in which the energy levels are encoded in the bitstream comprise one of time-differential encoding or frequency-differential encoding.

6. The method of claim 5, wherein frequency-differential encoding is utilized to encode energy levels responsive to a determination that a preceding frame included a transient.

7. The method of claim 1, further comprising applying a delay prior to determining the energy levels of the at least one first downmixed signal for the plurality of frequency bands.

8. The method of claim 7, wherein the delay corresponds to a delay associated with a core encoder that generates the encoded version of the first downmixed signal and a core decoder that reconstructs the audio signal.

9. The method of claim 1, further comprising:

determining whether to encode information indicative of energy levels associated with a second downmixed signal corresponding to a second frame of the audio signal; and responsive to a determination that information indicative of the energy levels associated with the second frame of the audio signal are not to be encoded, generating a second energy control value associated with the second frame that indicates that the information indicative of the energy levels are not included in the bitstream.

10. The method of claim 9, wherein the second energy control value indicates that energy correction gains associated with a previous frame are to be used by the decoder to adjust energy levels associated with the second downmixed signal corresponding to the second frame.

11. The method of claim 9, wherein the second energy control value indicates that the decoder is not to adjust energy levels associated with the second downmixed signal corresponding to the second frame.

12. The method of claim 1, wherein a bitrate of the bitstream is less than 50 kilobits per second (kbps).

13. A method for adjusting energy levels of audio signals, the method comprising:

obtaining, from a bitstream, a downmixed signal, metadata for upmixing the downmixed signal, and an energy control value indicative of whether energy levels are encoded in the bitstream, wherein the downmixed signal is a spatial audio downmixed signal generated from a multi-channel audio signal;

determining a mixing matrix based on the metadata;

determining energy levels of the downmixed signal for a plurality of frequency bands based on the energy control value and information indicative of the energy levels encoded in the bitstream, wherein the information indicative of the energy levels corresponds to envelope energy information of the downmixed signal that operates as redundant envelope energy information;

determining correction gains to be applied to the mixing matrix based on the determined energy levels for the plurality of frequency bands and the energy control value;

applying the correction gains to the mixing matrix to generate an adjusted mixing matrix, wherein applying the correction gains ensures alignment of energy levels of the downmixed signal with the redundant envelope energy information prior to upmixing the downmixed signal; and upmixing the downmixed signal using the adjusted mixing matrix to generate a reconstructed multi-channel spatial audio signal.

14. The method of claim 13, wherein the energy control value indicates that the energy levels are encoded in the bitstream, and wherein determining the correction gains is based on the energy levels encoded in the bitstream.

15. The method of claim 14, wherein the energy control value indicates one or more of:

a manner in which the energy levels are encoded in the bitstream; or energy levels are not encoded in the bitstream and that energy levels associated with a previous frame are to be used, and wherein determining the correction gains to be applied to the mixing matrix comprises obtaining correction gains applied to the previous frame; or energy levels are not encoded in the bitstream, and wherein determining the correction gains to be applied to the mixing matrix comprises fading correction gains applied to a previous frame toward a unity gain.

16. The method of claim 14, wherein the energy control value indicates a manner in which the energy levels are encoded in the bitstream, and wherein the manner in which the energy levels are encoded in the bitstream comprises one of time-differential encoding or frequency-differential encoding.

17. The method of claim 13, further comprising one or more of:

generating the mixing matrix to be applied to an entirety of the frame using a linear interpolation of parameters applicable to a previous frame and parameters applicable to the frame; or causing a representation of the reconstructed audio signal to be presented via a loudspeaker or headphones; or wherein a bitrate associated with the bitstream is less than about 40 kilobits per second (kbps).

18. An apparatus for implementing the method of claim 1.

19. One or more non-transitory media having software stored thereon, the software including instructions for controlling one or more devices to perform the method of claim 1.

* * * * *